United States Patent [19]

Ohnishi

[11] Patent Number: 5,444,771
[45] Date of Patent: Aug. 22, 1995

[54] FACSIMILE MACHINE HAVING ANSWERING FUNCTION

[75] Inventor: Toru Ohnishi, Kyoto, Japan

[73] Assignee: Murata Kikai Kabushiki Kaisha, Kyoto, Japan

[21] Appl. No.: 188,575

[22] Filed: Jan. 28, 1994

[30] Foreign Application Priority Data

Feb. 5, 1993 [JP] Japan .................. 5-019053

[51] Int. Cl.6 .................. H04M 11/00; H04M 1/64
[52] U.S. Cl. .................. 379/100; 379/88; 379/89
[58] Field of Search .................. 379/93, 96, 96, 97, 379/98, 100, 88, 89, 102; 358/400, 434, 435, 436, 438, 439, 468

[56] References Cited

U.S. PATENT DOCUMENTS

| | | | |
|---|---|---|---|
| 4,885,766 | 12/1989 | Yasucka et al. | 379/102 |
| 4,939,772 | 7/1990 | Goto et al. | 379/100 |
| 5,014,296 | 5/1991 | Saigano | 379/100 |
| 5,131,026 | 7/1992 | Park | 379/100 |
| 5,151,972 | 9/1992 | Lorenz et al. | 379/100 |

FOREIGN PATENT DOCUMENTS

| | | | |
|---|---|---|---|
| 0454452 | 10/1991 | European Pat. Off. | 379/100 |
| 0489917 | 6/1992 | European Pat. Off. | 379/100 |
| 2642925 | 8/1990 | France | 379/100 |

OTHER PUBLICATIONS

French Search Report, Application No. 9401289, Jun. 13, 1994.

Primary Examiner—Curtis Kuntz
Assistant Examiner—Jason Chan
Attorney, Agent, or Firm—Spensley Horn Jubas & Lubitz

[57] ABSTRACT

The facsimile machine has a CPU and a couple of memory devices which co-operate to change a control mode of the facsimile machine from a first control mode to a second control mode if a facsimile signal does not come from a calling party within a prescribed period from signal reception in the first control mode and for transmitting an answering message to the calling party, the first control mode enabling switching between voice transmission/reception and image data transmission/reception and the second control mode enabling switching between from-a-calling-party voice recording and image data transmission/reception.

6 Claims, 6 Drawing Sheets

FACSIMILE MACHINE HAVING ANSWERING FUNCTION

BACKGROUND OF THE INVENTION

1. Technical Field

The present invention relates to a facsimile machine having an answering function which has a control mode in which voice transmission/reception can be switched to image data transmission/reception and vice versa and another control mode in which from-a-calling-party voice message recording can be switched to image data transmission/reception and vice versa.

2. Background Art

Generally, a facsimile machine of the above-mentioned type includes a facsimile module for facsimile communication (image data transmission/reception to/from a third party) and an attached telephone for telephone communication (voice transmission/reception to/from the third party). Further, the facsimile machine is equipped with a recording device for recording a voice message from a calling party.

The facsimile machine generally has two control modes: during one control mode, a telephone function can be switched to a facsimile function and vice versa (tel/fax mode), and during another control mode, a recording function can be switched to a facsimile function and vice versa (ans/fax mode). Specifically, if a calling party sends a signal through a telephone when the facsimile machine on the receiving side is in the tel/fax mode, telephone conversation is permitted. If a calling party sends a signal through a facsimile machine when the facsimile machine on the receiving side is in the tel/fax mode, facsimile communication is permitted (or image data transmission is allowed). On the other hand, if the facsimile machine on the receiving side is in the ans/fax mode and a third party (calling party) sends a signal through a telephone, an answering message is transmitted to the third party upon signal reception and a voice message from the third party is recorded on the receiving side. If the third party sends a signal through a facsimile machine, image data transmission is allowed between the facsimile machine on a calling side (third party side) and the facsimile machine on the receiving side.

The facsimile machine includes a set up key for changing the control mode, and an operator manipulates the set up key to change the tel/fax mode to the ans/fax mode and vice versa.

This type of facsimile machine has the following problem: since the setting up key must be pressed by an operator, the change of the control mode is impossible when the operator is out. Accordingly, if the operator goes out with the facsimile machine being set to the tel/fax mode, a message (voice) from a third party will not be recorded.

SUMMARY OF THE INVENTION

An object of the present invention is to provide a facsimile machine which can eliminate the above-described problem. Specifically, the object of the present invention is to allow a user to change the control mode from a distance so that even if the user goes out with the facsimile machine being set to a recording-impossible mode, the user can change the control mode to a recording-possible mode and a message from a third party will be recorded.

According to one aspect of the present invention, there is provided a facsimile machine having an answering function characterized in that the facsimile machine includes setting up means for changing a control mode of the facsimile machine from a first control mode to a second control mode if a facsimile signal does not come from a calling party within a prescribed period from signal reception in the first control mode and for transmitting an answering message to the calling party, the first control mode enabling switching between voice transmission/reception and image data transmission/reception and the second control mode enabling switching between from-a-third-party voice recording and image data transmission/reception.

If a user of the facsimile machine goes out with the facsimile machine being set to the first control mode, the user calls the facsimile machine from outside through a telephone. Upon signal reception, the facsimile machine tries to detect a facsimile signal from a calling party (user). However, no facsimile signal comes and a prescribed period elapses (the user keeps off hooking the telephone during this period). Then, the setting up means changes the control mode to the second control mode from the first control mode. After that, the user on hooks the telephone, and the facsimile machine is now ready for recording a voice from a calling party. In a word, simply dialing a facsimile number from outside and waiting for a while result in the automatic control mode change.

Upon control mode change to the second control mode, an answering message is transmitted to the calling party (user). Therefore, the user hears the answering message and can easily and reliably confirm that the change to the second control mode from the first control mode is completed.

BRIEF DESCRIPTION OF THE DRAWINGS

FIG. 2 is a set of timing charts of the facsimile machine shown in FIG. 1, in which

DETAILED DESCRIPTION OF THE PREFERRED EMBODIMENTS

Now, preferred embodiments of the present invention will be described.

First Embodiment

A first embodiment will be explained with FIGS. 1-5 of the accompanying drawings.

Figure 1:
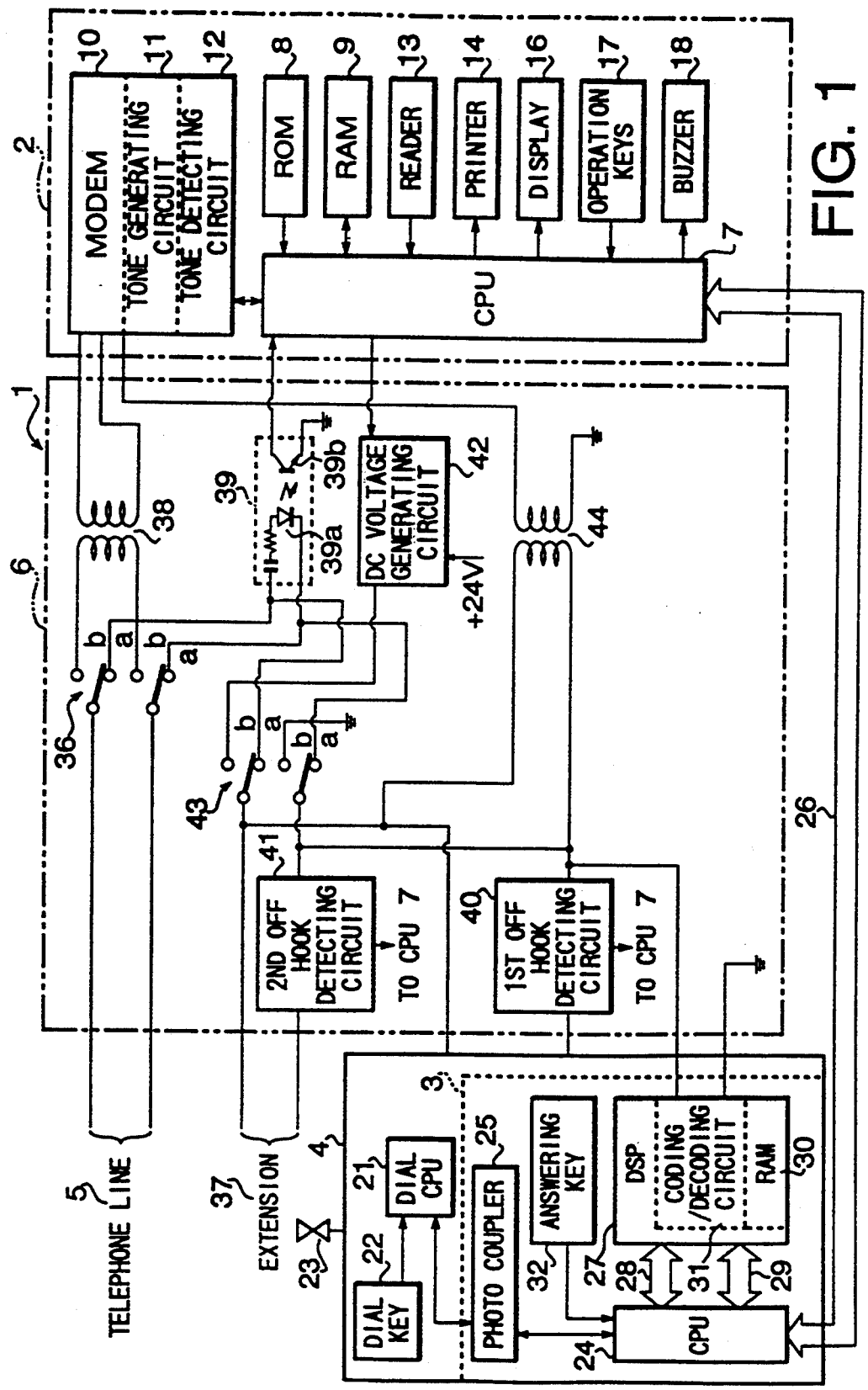
FIG. 1 is a block diagram of a facsimile machine having an answering function according to a first embodiment of the present invention.

Referring to FIG. 1, a facsimile machine 1 includes a facsimile module 2, an attached telephone 4 and an NCU (Network Control Unit) 6. The attached telephone 4 has a recording unit 3. The facsimile module 2 performs facsimile functions, i.e., image data transmission/reception between a third party and itself. The recording unit 3 records a voice from a calling party. The attached telephone 4 performs telephone functions, i.e., voice transmission/reception between a third party and itself. The NCU 6 controls connection with a telephone line 5.

Next, the facsimile module 2 will be explained in depth. A ROE 8 and a RAM 9 are connected with a CPU 7. The ROE 8 stores a program for controlling overall operations of the facsimile module 2 and the NCU 6. The RAM 9 temporarily stores various information. A modem 10 modulates/demodulates data to be transmitted/received. Generation and detection of push-tone (DTMF) signals which correspond to dialed telephone numbers, digital command signals (DCS), digital identification signals (DIS) and the like are also performed by tile modem 10.

A tone generating circuit 11 and a tone detecting circuit 12 are incorporated in the modem 10. The tone generating circuit 11 generates a CNG signal of 1,100 Hz, a called station identification (CED) signal of 2,100 Hz, a pseudo ring-back tone (will be described later) and the like. The tone detecting circuit 12 includes a bandpass filter (not shown), a zero-cross detecting circuit (not shown) and a level detecting circuit (not shown) to detect a CNG signal and a CED signal from a third party. When the tone detecting circuit 12 detects a tone signal which is transmitted from a third party, it outputs a frequency and a level of the tone signal to the CPU 7 in the form of digital data. The CPU 7 identifies the kind of the signal (the CNG signal, the CED signal, a non-voice situation or others) based on the digital data from the tone detecting circuit 12.

A reader 13, a printer 14, a display 16, a function key set 17, an operation key set (will be described later), a buzzer 18 and other keys (not shown) are connected with the CPU 7. The reader 13 reads image on a document, the printer 14 performs printing on a recording sheet based on image data sent from a third party and the display 16 displays various information. A start key is included in the operation key unit and an operator presses the start key to initiate facsimile operations. The buzzer 18 generates a buzzer sound to inform the operator of signal reception.

Next, the attached telephone 4 will be explained in detail. The attached telephone 4 includes a dial CPU 21 to control overall operations of the attached telephone 4 except the recording unit 3. An operation key set such as a dial key set 22 is connected to the dial CPU 21 to input telephone numbers and the like. The attached telephone 4 has a handset 28.

The recording unit 3 includes a CPU 24 to control overall operations of the recording unit 8, i.e., operations of the attached telephone 4 concerning the recording are controlled by the CPU 24. The CPU 24 is connected to the dial CPU 21 via a photocoupler 25 and the CPU 7 of the facsimile module 2 via a bus (serial bus) 26 for serial communication. Serial communications are performed between the CPU 24 of the recording unit 3 and the dial CPU 21 of the attached telephone 4 and between the CPU 24 and the CPU 7 of the facsimile module 2.

A DSP (Digital Signal Processor) 27 is incorporated in the recording unit 3 for digital processing a voice signal and connected with the CPU 24 via an address bus 28 and a data bus 29. The DSP 27 includes a RAM 30 and a coding/decoding circuit 31. The RAM 30 stores the voice data in a coded state and the coding/decoding circuit 81 codes/decodes the voice data. An answering key 32 (will be described later), a play (reproduction) key (not shown) and other operation keys (not shown) are also connected with the CPU 24 of the recording unit 3. The operator presses the play key to reproduce the voice date stored in the RAM 30.

Next, the NCU 6 will be explained. A CML relay 36 is provided for selectively connecting the telephone line 5 with the mode 10 of the facsimile module 2 or with the telephones 4 and an another telephone 37. The telephone 37 is an extension connected to the facsimile machine 1 via a cable (not shown). Under control of the CPU 7 of the facsimile module 2, the telephone line 5 is connected with the telephone 4/37 side when the CML relay 36 is switched to a point "a". On the other hand, when the CML relay 36 is switched to a point "b", the telephone line 5 is connected with the modem 10 side via a transformer 38.

A signal reception detecting circuit 39 includes a photocoupler, and an LED 39a is connected with the point "a" of the CML relay 36 and a phototransistor 39b is connected with the CPU 7 of the facsimile module 2. The CPU 7 monitors on/off of the phototransistor 39b and detects presence of a calling signal of 16 Hz on the telephone line 5. First and second off hook detecting circuits 40 and 41 are connected with the attached telephone 4 and the extension 37 to detect off hooking (or picking up) of the telephones 4 and 37. Detection results are outputted to the CPU 7 of the facsimile module 2. The detection result of the first off hook detecting circuit 40 is also outputted to the dial CPU 21 of the attached telephone 4.

A direct voltage generating circuit 42 is provided for feeding a predetermined current to the telephones 4 and 37 to detect the off hooking of the telephones 4 and 37. An input voltage of +24V is given to this circuit 42. Specifically, if the telephone 4/37 is off hooked, change of the current fed to the telephone 4/37 is detected by the off hook detecting circuit 40/41. Then, the CPU 7 of the facsimile module 2 and the dial CPU 21 of the attached telephone 4 confirm the off hooking based on the current change detected by the off hook detecting circuit 40/41.

The direct voltage generating circuit 42 is connected with the telephones 4 and 37 via a TEL relay 43. When the circuit 42 is connected with the telephones 4 and 37, the telephones 4 and 37 are disconnected from the telephone line 5. Specifically, under control of the CPU 7 of the facsimile module 2, when the TEL relay 43 is switched to a point "a", the telephones 4 and 37 are connected with the telephone line 5 side. On the other hand, when the TEL relay 43 is switched to a point "b", the telephones 4 and 37 are connected with the direct voltage generating circuit 42 side. A transformer 44 is connected with the telephones 4 and 37 and its output is connected with the modem 10.

Next, the function key set 17 and the answering key 32 will be explained. The function key set 17 are provided for setting up various functions. Upon manipulation of the function key set 17, various setting up menus are successively displayed on the display 16. These setting up menus are stored in the ROM 8 of the facsimile module 2 beforehand. The menus include a menu for switching "tel/fax switching=ON" to "tel/fax switching =OFF" and vice versa. When certain keys are pressed while the setting up menus are being displayed, the CPU 7 of the facsimile machine 2 makes the "tel/fax switching" "ON" or "OFF".

The answering key 32 is provided for setting and resetting the ans/fax mode. Specifically, when the answering key 32 is manipulated, the CPU 24 of the recording unit 3 transmits an at-home setting signal or an out-of-home (or answering) setting signal to the CPU 7 of the facsimile module 2. Then, the CPU 7 of the facsimile module 2 sets up the control mode of the facsimile machine 1 to the first control mode (tel/fax mode) upon reception of the at-home setting signal if the tel/fax switching has been made ON by the operator manipulating the operation key 17. On the other hand, if the tel/fax switching has been made OFF, the CPU 7 selects a telephone mode as it receives the at-home setting signal. Further, if the answering setting signal is inputted to the CPU 7, the CPU 7 selects the second control mode (ans/fax mode) regardless of ON and OFF of the tel/fax switching.

Therefore, as the operator manipulates the function key set 17 and the answering key 32, the facsimile machine 1 is set up to one of three control modes, i.e., the telephone mode, the tel/fax mode or the ans/fax mode. During a stand-by state of the facsimile machine 1, the CML relay 36 and the TEL relay 43 are connected to the points "a", respectively, regardless of the particular control mode selected.

Next, each control mode will be explained. The telephone mode is a control mode for common telephone operations. When the telephone mode is selected, the attached telephone 4 and the extension 37 are caused to ring upon reception of a calling signal of 16 Hz from a telephone exchange (the telephone exchange sends the calling signal to the facsimile machine 1) as a third party dials a number of the facsimile machine 1. When the operator hears the ringing and off hooks the attached telephone 4 or the extension 37, the operator can talk to a calling party if the calling party is contacting through a telephone. At this point, the CML relay 36 and the TEL relay 43 are connected with the points "a", respectively.

If the calling party uses a facsimile machine or the calling party wants to send image data after telephone conversation, the operator of the facsimile machine 1 presses the start key (or facsimile communication key; not shown) of the facsimile module 2. Then, the CPU 7 of the facsimile module 2 switches the contact of the CML relay 36 from the point "a" to the point "b" to initiate predetermined operations for the facsimile communication.

The ans/fax mode is a second control mode in which the voice recording or the facsimile communication is selectively performed. In this mode, if a calling signal of 16 Hz is transmitted to the facsimile machine 1 from the telephone exchange, the CPU 7 of the facsimile module 2 detects the calling signal via the signal reception detecting circuit 39. When the CPU 7 detects the calling signals predetermined times (twice in this embodiment), it sends a signal reception-start command signal to the CPU 24 of the recording unit 3 to make the CPU 24 ready for the signal reception. Then, the CPU 24 of the recording unit 3 closes the line and activates the DSP 27 to read the data of answering message (voice) stored in the RAM 30. The DSP 27 decodes the data of the answering message in the coding/decoding circuit 31 and transmits it to the calling party via the NCU 6 and the telephone line 5.

The CPU 24 of the recording unit 3 causes the DSP 27 to start the recording upon completion of reading of the answering message. As a voice of the calling party comes, the DSP 27 codes data of the coming voice in the coding/decoding circuit 31 and stores it in the RAM 30. At this point, the CML relay 36 and the TEL relay 43 are inclined to the contacts "a", respectively.

During the ans/fax mode, if the CNG signal from the calling party is detected twice by the tone detecting circuit 12 or a non-voice situation lasts eight seconds after the initiation of the recording, the CPU 7 of the facsimile module 2 switches the contact of the CML relay 36 to the point "b" from the point "a". Specifically, the CPU 7 judges that the calling party is sending a signal through a facsimile machine and switches the connection-to-the-telephone-line 5 to the mode 10 side from the telephone 4/37 side to start predetermined facsimile operations. Simultaneously, the CPU 7 of the facsimile module 2 transmits a recording-stop command signal to the CPU 24 of the recording unit 3. Upon reception of the recording-stop command signal, the CPU 24 terminates the recording of the voice (message from the calling party) at the DSP 27.

In this embodiment, the CNG signal of 0.5 second is regularly transmitted from the calling party at three-second intervals. Detecting the CNG signal twice means detecting the CNG signal successively twice with a three-second interval. The frequency of the CNG signal is 1,100 Hz and a frequency range of a human voice includes 1,100 Hz. Therefore, detecting the CNG signal once cannot determine whether the signal from the calling party is a signal of human voice or the CNG signal. However, the CNG signal which lasts 0.5 second is repeatedly and regularly whereas the human voice signal is transmitted randomly. Therefore, if a signal of 1,100 Hz is successively detected twice with a three-second interval, it can be said without doubt that the signal is a CNG signal and the calling party uses a facsimile machine. Accordingly, the facsimile operations should be executed in turn. On the other hand, if a period between first detection of a 1,100 Hz signal and second detection of the same is outside a range of 2.5 to 6 seconds, it is judged that the signal is not a CNG signal and the facsimile operations are not performed.

If the calling party manually transmits a facsimile signal, a CNG signal is not sent to the called party. The present invention can also cope with this case. In such a case, when a non-voice period lasts eight seconds, it is judged on the receiving side that no voice comes from the calling party or the voice transmission from the calling party is completed while assuming that the calling party sends a facsimile signal manually. Thus, the facsimile machine on the receiving side starts the facsimile operation automatically.

In this embodiment, when a calling signal comes from the telephone exchange in the telephone mode, the CPU 7 of the facsimile module 2 causes the signal reception detecting circuit 39 to count how many times the calling signal comes. Then, as shown in FIG. 2(a), the CPU 7 changes the control mode of the facsimile machine 1 to the ans/fax mode from the telephone mode when the calling signal comes predetermined times (twenty times in this embodiment).

After that, the CPU 7 of the facsimile module 2 sends a command signal to set up an answering function to the CPU 24 of the recording unit 3. The CPU 24 brings the recording unit 3 into a stand-by state. At the same time, the CPU 7 transmits a signal reception-start command signal to the CPU 24 of the recording unit 3 to inform the CPU 24 of the signal reception. Therefore, like the ans/fax mode described above, the CPU 24 of the recording unit 3 activates the DSP 27 to send an answering message (voice message) to the calling party and start the recording the voice from the calling party; if a facsimile signal is sent from the calling party, the operation to receive the facsimile signal is initiated. After this, the control mode of the facsimile machine 1 is maintained to the ans/fax mode.

Next, the first control mode (tel/fax mode) will be explained. In the first control mode, the telephone function or the facsimile function is selectively chosen. If a calling signal of 16 Hz comes from a telephone exchange during this mode, the CPU 7 of the facsimile module 2 detects the calling signal at the signal reception detecting circuit 39. The telephones 4 and 37 are not caused to ring upon reception of the calling signal from the telephone exchange during the tel/fax mode.

Figures 2A, 2B:
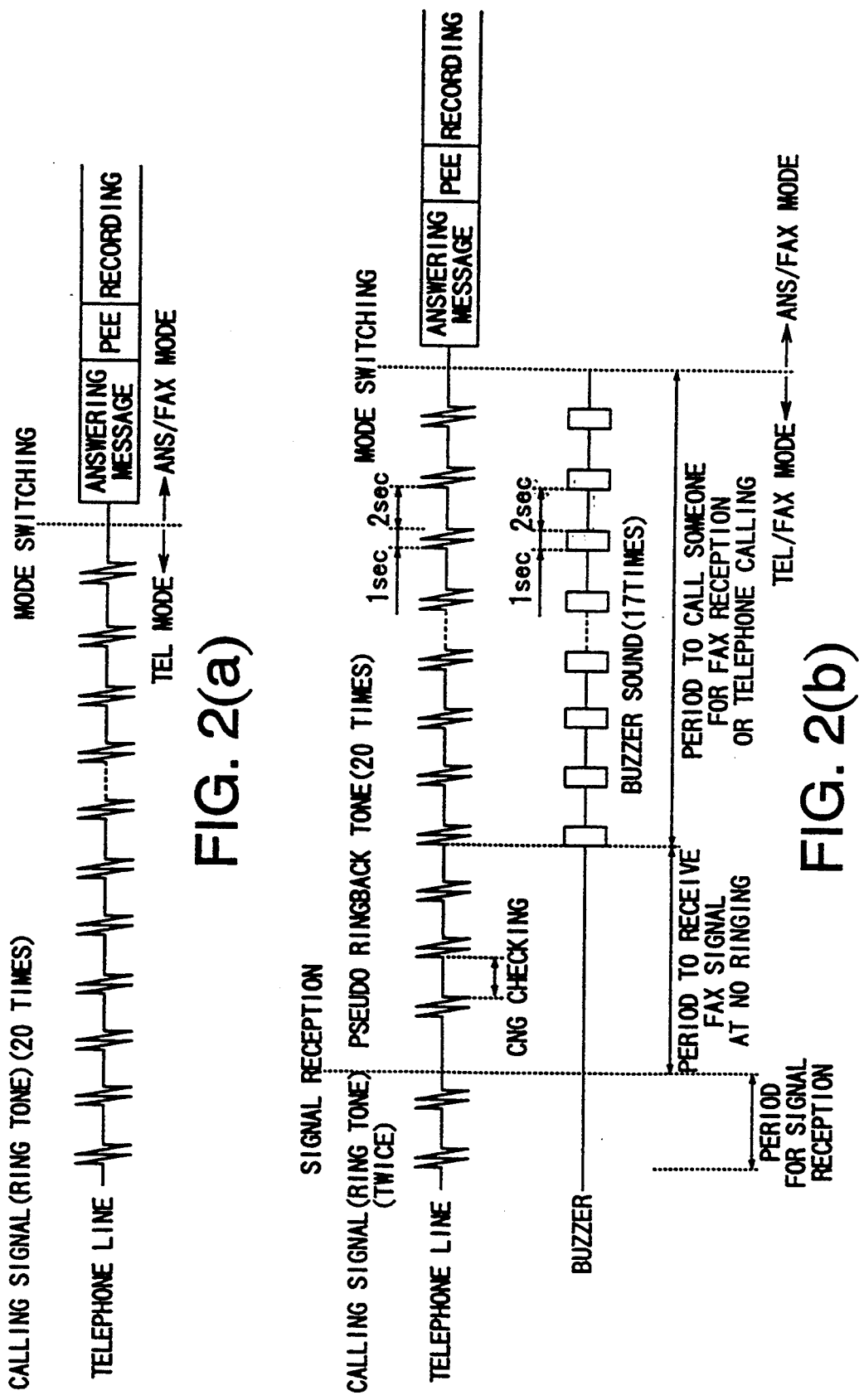
FIG. 2(a) shows signal reception during a telephone mode and FIG. 2(b) shows signal reception during a tel/fax mode.

The CPU 7 of the facsimile module 2 changes the contacts of the CML relay 36 and the TEL relay 43 to the points "b" from the points "a", respectively, to accept the coming signal when the calling signal is detected twice, as illustrated in FIG. 2(b). Then, the CPU 7 activates the tone generating circuit 11 in the modem 10 to transmit a pseudo ringback tone to the calling party predetermined times (twenty times in this embodiment) and causes the tone detecting circuit 12 to detect a CNG signal from the calling party. When the CNG signal is detected once, the CPU 7 judges that the calling party uses a facsimile machine and initiates prescribed facsimile operations.

Here, the pseudo ringback tone is a ringback tone which is sent to the calling party artificially. Specifically, the facsimile module 2 receives the coming signal and connects the line to the calling party as the calling signal is transmitted from the telephone exchange twice, as shown in FIG. 2(b). At this point, the ringback tone to be sent to the calling party from the telephone exchange is stopped. However, if the calling party uses a telephone, a handset on the called side is not off hooked yet so that this situation is the same as disconnection of the line between the calling party and the called party. It is not natural that no response is given to the calling party from the called party (facsimile machine 1 of the present invention) upon termination of the ringback tone after twice sending of the ringback tone. Therefore, when the calling signal from the telephone exchange is detected on the called side twice, the called party (CPU 7) sends the pseudo ringback tone to the calling party.

The pseudo ringback tone lasts one second and is transmitted twenty times at two-second intervals. Therefore, the pseudo ringback tone is transmitted some sixty seconds as a whole. While the pseudo ringback tone is being sent, the tone detecting circuit 12 cannot detect the CNG signal. Thus, the detection of the CNG signal is performed during the above-mentioned two-second intervals, in which the pseudo ringback tone is not sent. In other words, the transmission of the pseudo ringback tone and the detection of the CNG signal are conducted alternatively.

When the pseudo ringback tone has been transmitted four times but a CNG signal is not yet detected, the CPU 7 of the facsimile module 2 assumes that the calling party may be a telephone. Then, the CPU 7 activates the buzzer 18 to generate a buzzer sound predetermined times (seventeen times in the illustrated embodiment). In short, during the tel/fax mode, the telephones 4 and 37 are not rung upon arrival of the calling signal from the telephone exchange, but the buzzer sound is generated to inform the operator of the arrival of a signal from a calling party.

When the operator hears the buzzer sound and picks up the attached telephone 4 or the extension 37, the first or second off hook detecting circuit 40 or 41 detects the off hooking and outputs a detection signal to the CPU 7 of the facsimile module 2. Then, the CPU 7 switches the contacts of the CML relay 36 and the TEL relay 43 to the points "a" from the points "b", respectively so that the telephone line 5 is connected with the telephone 4/37 side and the telephone conversation is permitted. Thus, if the calling party uses a telephone, the calling party and the called party can verbally communicate with each other. Meanwhile, if the calling party uses a facsimile machine and the operator on the called side picks up the telephone, a CNG signal is transmitted from the calling side and the operator presses the start key to initiate the reception of a facsimile signal.

In this embodiment, the CPU 7, the ROM 8 and the RAM 9 of the facsimile module 2 constitute in combination set-up means. Specifically, if the pseudo ringback tone is sent twenty times and the buzzer sound is generated seventeen times in the tel/fax mode, i.e., if a CNG signal and off hooking are not detected within a predetermined period (some sixty seconds) from the signal reception in the tel/fax mode, the CPU 7 changes the control mode to the ans/fax mode from the tel/fax mode to start sending the answering message to the calling party.

In other words, the CPU 7 of the facsimile module 2 waits for a CNG signal from the calling party for about sixty seconds from the signal arrival. If no CNG signal is detected within the about sixty seconds, the CPU 7 judges that the calling party does not use a facsimile machine but uses a telephone. In addition, the CPU 7 considers like this: a fact of the telephone being not on hooked on the calling side with the line being connected while no response is being sent back for about sixty seconds indicates that the handset is intentionally off hooked on the calling side. Accordingly, the CPU 7 changes the control mode to the ans/fax mode.

The CPU 7 transmits a command signal to set up an answering function to the CPU 24 of the recording unit 3 and the CPU 24 brings the recording unit 3 into a stand-by state for the answering and recording operation. At the same time, the CPU ? of the facsimile module 2 sends a signal reception-start command signal to the CPU 24 of the recording unit 3 to causes the CPU 24 to receive a coming signal. Then, the contacts of the CML relay 36 and the TEL relay 43 are switched to the points "a", respectively. Therefore, like the case of ans/fax mode described earlier, the CPU 24 of the recording unit 3 activates the DSP 27 to send the answering message to the calling party and start recording the voice from the calling party. If the calling party uses a facsimile machine, facsimile communication is initiated. After this, the control mode of the facsimile machine 1 on the called side is maintained to the ans/fax mode.

The operator of the facsimile machine 1 manipulates the function key set 17 to display the set up menus on the display 16. In the displayed menus, included are "REMOTE ANSWERING SET UP=ON" and "REMOTE ANSWERING SET UP=OFF". If the operator presses a certain key to select one of these menus while these menus are being displayed, the CPU 7 of the facsimile module 2 sets up the remote answering-set-up mode to "ON" or "OFF" Only when "ON" is selected, the above-mentioned automatic change to the ans/fax mode is carried out.

When the remote answering-set-up is "OFF", the automatic change of the control mode is not executed. Therefore, even if the calling signal from the telephone exchange is counted twenty times in the telephone mode, the attached telephone 4 and the extension 37 are caused to keep ringing. In the tel/fax mode, if the pseudo ringback tone is transmitted twenty times, the line is disconnected.

Next, operations of the facsimile machine 1 having the above-described structure will be explained with a timing chart shown in FIG. 2 and flowcharts shown in FIGS. 3-5.

Figure 3:
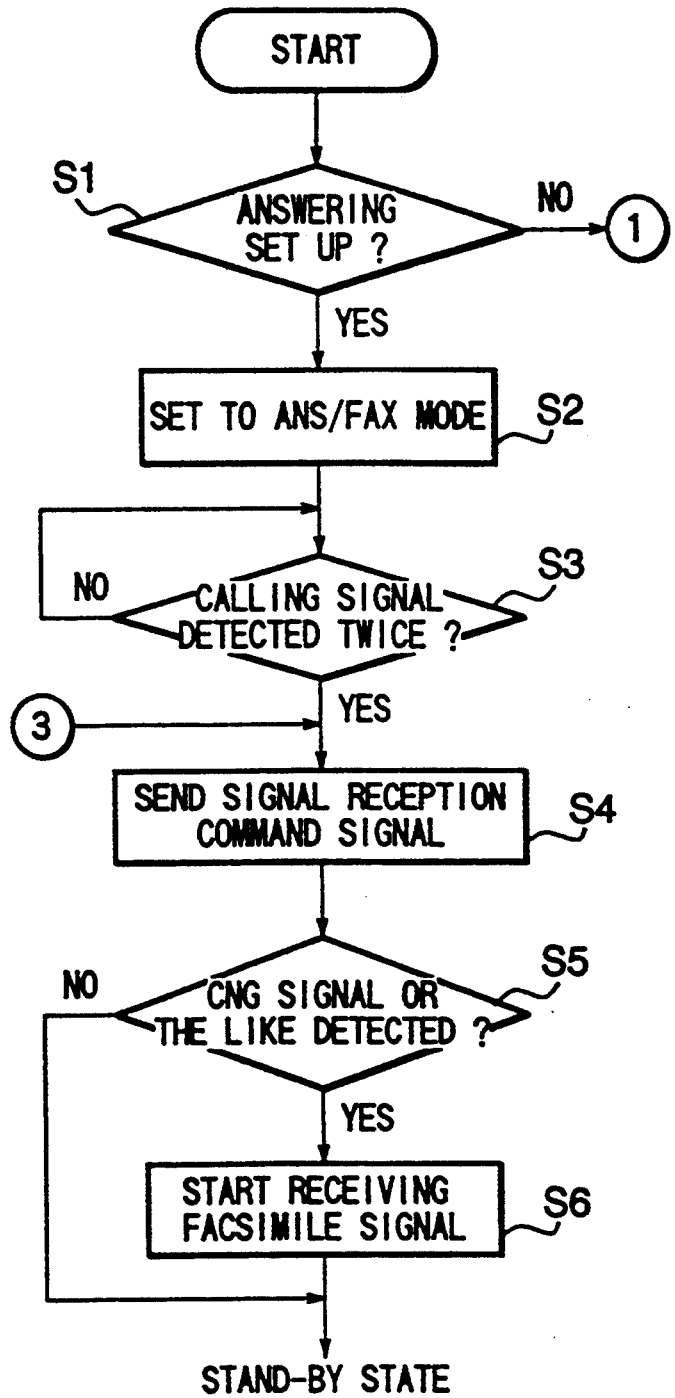
FIG. 3 is a flowchart for signal reception during an ans/fax mode of the facsimile machine shown in FIG. 1.
Figure 4:
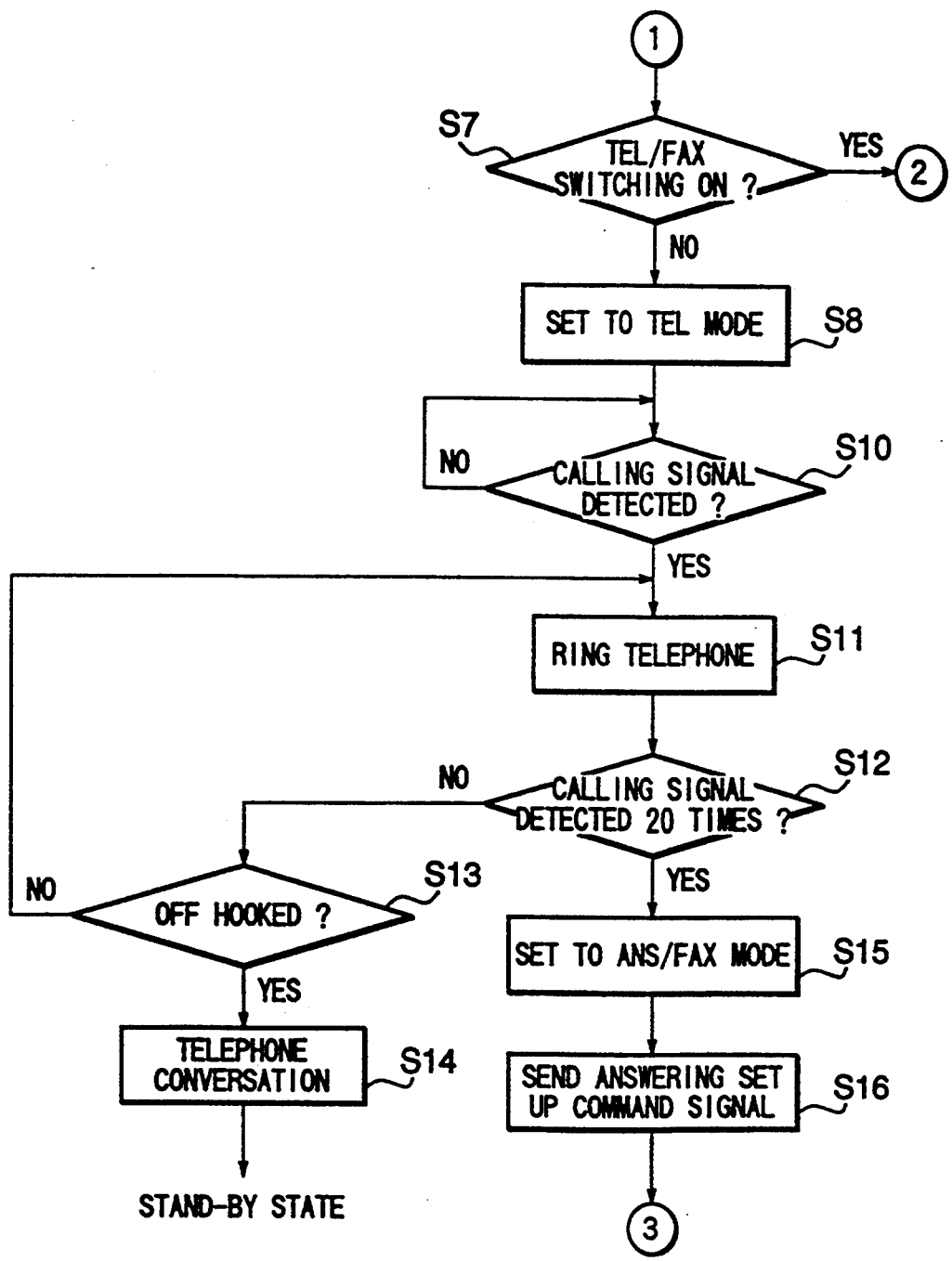
FIG. 4 is a flowchart for signal reception during the telephone mode.
Figure 5:
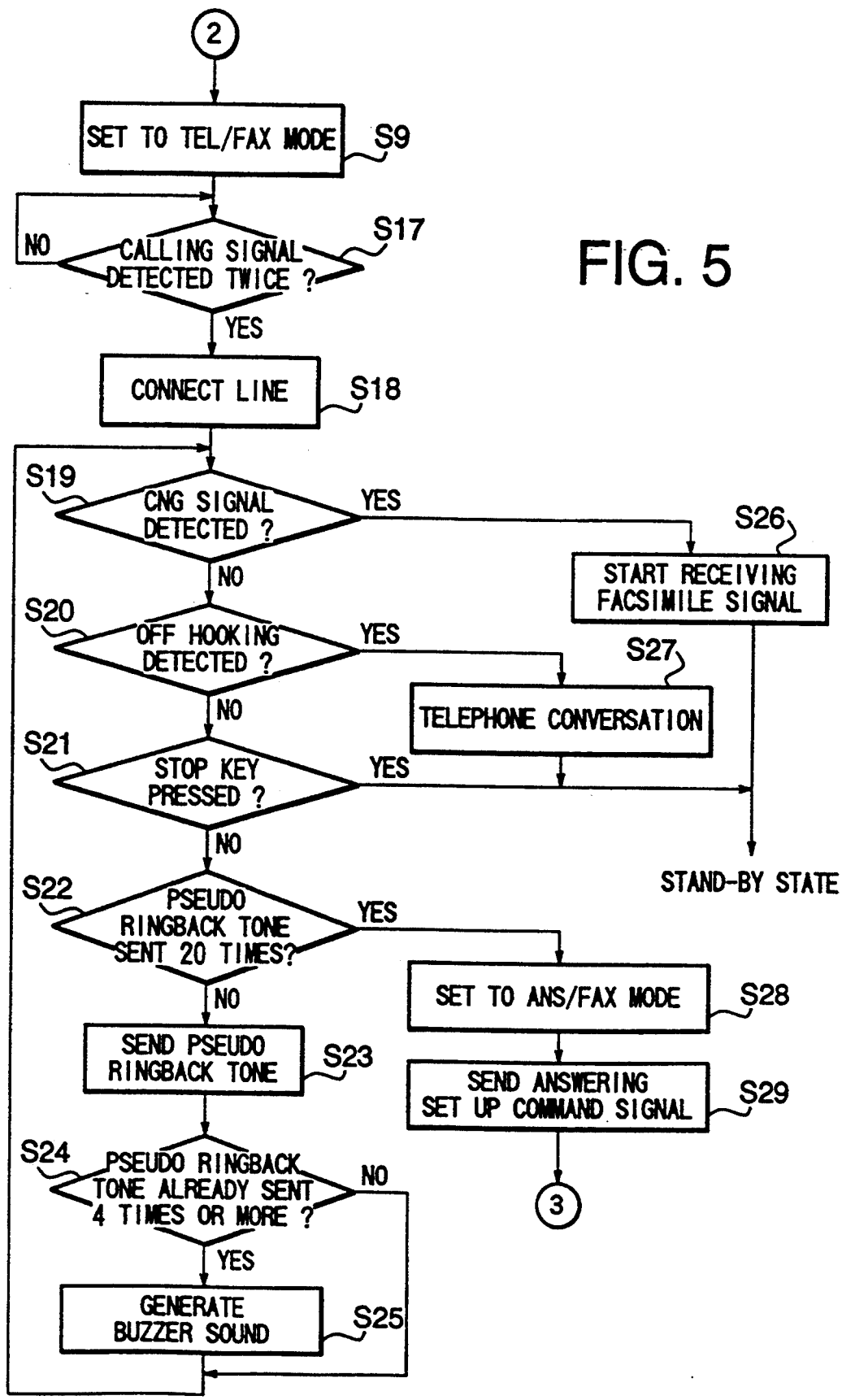
FIG. 5 is a flowchart for signal reception during a tel/fax mode.

During the signal reception at the facsimile machine 1, the operations indicated in the flowcharts of FIGS. 3-5 are executed under control of the CPU 7 of the facsimile module 2. Here, the remote answering-set-up is already turned ON by an operator manipulating the function key set 17. In other words, if the operator presses the answering key 32 to set up the answering function, the control mode of the facsimile machine 1 is set up to the ans/fax mode (S1 and S2), as shown in FIG. 3.

In the ans/fax mode, when a calling signal of 16 Hz is transmitted from a telephone exchange through the telephone line 5 and the calling signal is detected by the CPU 7 twice, a signal reception-start command signal is sent to the CPU 24 of the recording unit 3 (S3 and S4). Then, the recording unit 3 is activated, the line is closed, an answering message is transmitted to a calling party and a voice from the calling party is recorded.

After the recording unit 3 starts the recording, the contacts of the CML relay 36 and the TEL relay 43 are switched to the points "b" respectively when a CNG signal from the calling party is detected twice. Then, the recording by the recording unit 3 is terminated whereas the facsimile signal reception is initiated to receive image data transmitted from the calling party (S5 and S6). After that, the line is disconnected and the facsimile machine 1 is brought into a stand-by state.

Referring to FIG. 4, if the answering function is not set up at S1, it is judged whether the tel/fax mode is made ON by the operator manipulating the function key 17 (S7). If the answer is NO, the control mode of the facsimile machine 1 is set to the telephone mode (S8). If the answer is YES, the control mode is set to the tel/fax mode (S9), as shown in FIG. 5.

Referring back to FIG. 4, if a 16 Hz calling signal is transmitted from the telephone exchange in the telephone mode, the attached telephone 4 and the extension 37 are rung (S10 and S11). Then, if the attached telephone 4 or the extension 37 is off hooked before the calling signal (or ringing) is detected twenty times, telephone conversation with the calling party is permitted (S12-S14) as long as the calling party sends a signal through a telephone. Not shown in the flowcharts though, if the line is disconnected on the calling side before the calling signal is detected twenty times, the facsimile machine 1 on the called side is set to the stand-by state.

If the off hooking is not detected and the calling signal is detected twenty times, the control mode of the facsimile machine 1 is changed to the ans/fax mode from the telephone mode (S15). Then, the answering-set-up command signal is transmitted to the CPU 24 of the recording unit 3 so that the recording unit 3 is brought into a answering/recording stand-by state (S16). At the same time, the program proceeds to S4 in FIG. 3 to send a signal reception-start command signal to the CPU 24 of the recording unit 3 so that, like the case of ans/fax mode, the line is connected, the answering message is transmitted to the calling party and the voice from the calling party is recorded. After that, the control mode of the facsimile machine 1 is maintained to the ans/fax mode.

Therefore, even if a user of the facsimile machine 1 goes out with the telephone mode being set up, the user can easily change the control mode to the ans/fax mode from the telephone mode by dialing its own number and waiting for twenty times of ringing of the ringback tone. After that, when a third party calls, its voice will be recorded in the facsimile machine 1. The user does not have to return to his or her house to press the answering key 32.

In this embodiment, in addition, when the control mode is changed to the ans/fax mode by a user calling from outside, an answering message is transmitted to the user. Thus, the user hears the answering message and can easily and reliably confirm the change of the control mode to the ans/fax mode. When the user off hooks the telephone, the automatic change to the ans/fax mode is completed.

On the other hand, as shown in FIG. 5, if the tel/fax mode is selected, a calling signal is transmitted from the telephone exchange and the calling signal is detected twice by the CPU 7, the contacts of the CML relay 36 and the TEL relay 43 are switched to the points "b" respectively and the line is connected to receive the coming signals (S17 and S18). After that, the pseudo ringback tone is transmitted twenty times and it is judged whether a CNG signal is received, the telephone 4 or 37 is off hooked and a stop key (will be described later) is pressed in a some sixty-second period during which the buzzer sound is generated seventeen times (S19-S25).

Now, the above-mentioned judgments will be explained in turn. First, the reception of the CNG signal is judged at S19. If it is received, the facsimile machine 1 judges that the calling party sends a signal through a facsimile machine, and starts the facsimile signal reception to receive the image data transmitted from the calling party (S26). After that, the contacts of the CML relay 36 and the TEL relay 43 are switched to the points "a" respectively so that the line is disconnected and the facsimile machine 1 returns to the stand-by state.

If the CNG signal is not detected at S19, then it is judged whether the off hook detecting circuits 40 and 41 detect the off hooking of the telephones 4 and 37 (S20). If the off hook detection signal is inputted to the CPU 7, telephone communication is permitted so that conversation with the calling party starts if the calling party accesses through a telephone (S27). On the other hand, if the calling party accesses through a facsimile machine, the operator (or user) on the called side presses the start key to initiate the facsimile operation. And, when the telephone communication or the facsimile communication is completed, the line is disconnected and the facsimile machine 1 enters the stand-by state.

If the off hook detection signal is not inputted to the CPU 7 at S20, it is then judged whether the stop key (not shown) is pressed (S21). It should be noted that the stop key is connected with the CPU 7 of the facsimile module 2 and is used to deactivate the facsimile operation. Upon pressing of the stop key, the line is disconnected and the facsimile machine 1 is brought into the stand-by state.

If the stop key is not pressed at S21, it is judged whether the pseudo ringback tone has been transmitted twenty times. If the answer is NO, the transmission of the pseudo ringback tone is continued (S22 and S23). Next, it is Judged whether the pseudo ringback tone is sent four times or more. If the answer is YES, the buzzer 18 is activated to generate a buzzer sound (S24 and S25).

Specifically, when the pseudo ringback tone is transmitted four times but the CNG signal is not detected yet, it is assumed that the calling party uses a telephone. Thus, the buzzer sound is generated to call someone.

After that, the program returns to S19 to repeat the loop of S19–S25 (FIG. 5). If the pseudo ringback tone is sent twenty times while the CNG signal or the off hooking is not being detected at S22, the control mode of the facsimile machine 1 is changed to the ans/fax mode from the tel/fax mode (S28). Then, the answering-set-up command signal is given to the CPU 24 of the recording device 3 and the recording device 3 is brought into the answering/recording stand-by state (S29). Simultaneously, the program proceeds to S4 in FIG. 3 to transmit the signal reception-start command signal to the CPU 24 of the recording device 3 and, like the case of ans/fax mode, the contacts of the CML relay 36 and the TEL relay 43 are switched to the points "a" respectively to send the answering message (voice) to the calling party and record the voice from the calling party. After that, the facsimile machine 1 is maintained to the ans/fax mode.

As mentioned above, the facsimile machine 1 of this embodiment waits for a CNG signal from the calling party sixty seconds or more from the signal reception. Then, if the CNG signal is not received, the facsimile machine 1 on the called side considers that the calling party may be a telephone, not a facsimile machine. Further, a fact that no response returns from the called party (facsimile machine 1) in sixty seconds from the signal reception but the handset is not on hooked on the calling side with the line being connected indicates that the off hooking state is intentionally maintained on the calling side. Therefore, the facsimile machine 1 on the called side is changed to the ans/fax mode.

If the user of the facsimile machine 1 goes out with the facsimile machine 1 being set to the tel/fax mode but later wants to change the control mode to the ans/fax mode, the user calls the facsimile machine 1 from outside. Then, the user maintains the off hook state about sixty seconds from the signal reception at the called side, i.e., the user hangs up to hear the pseudo ringback tone twice. This automatically changes the control mode to the ans/fax mode.

As understood from the above, calling its own facsimile machine 1 from outside results in automatic change of the control mode to the ans/fax mode. After that, therefore, the facsimile machine 1 will function as an answering machine and can record a message from a third party. The user of the facsimile machine 1 does not have to go back home to press the answering key 32 to change the control mode to the ans/fax mode.

In this embodiment, further, upon change of the control mode to the ans/fax mode, the answering message is transmitted to the user calling from outside. Therefore, the user can easily and reliably confirm the change of the control mode to the ans/fax mode by hearing the answering message from the facsimile machine 1. When the user on hooks the handset after hearing the answering message, the automatic change to the ans/fax mode is completed. Therefore, it is not necessary for the user to redial in order to confirm completion of the changing of the control mode.

Second Embodiment

Figure 6:
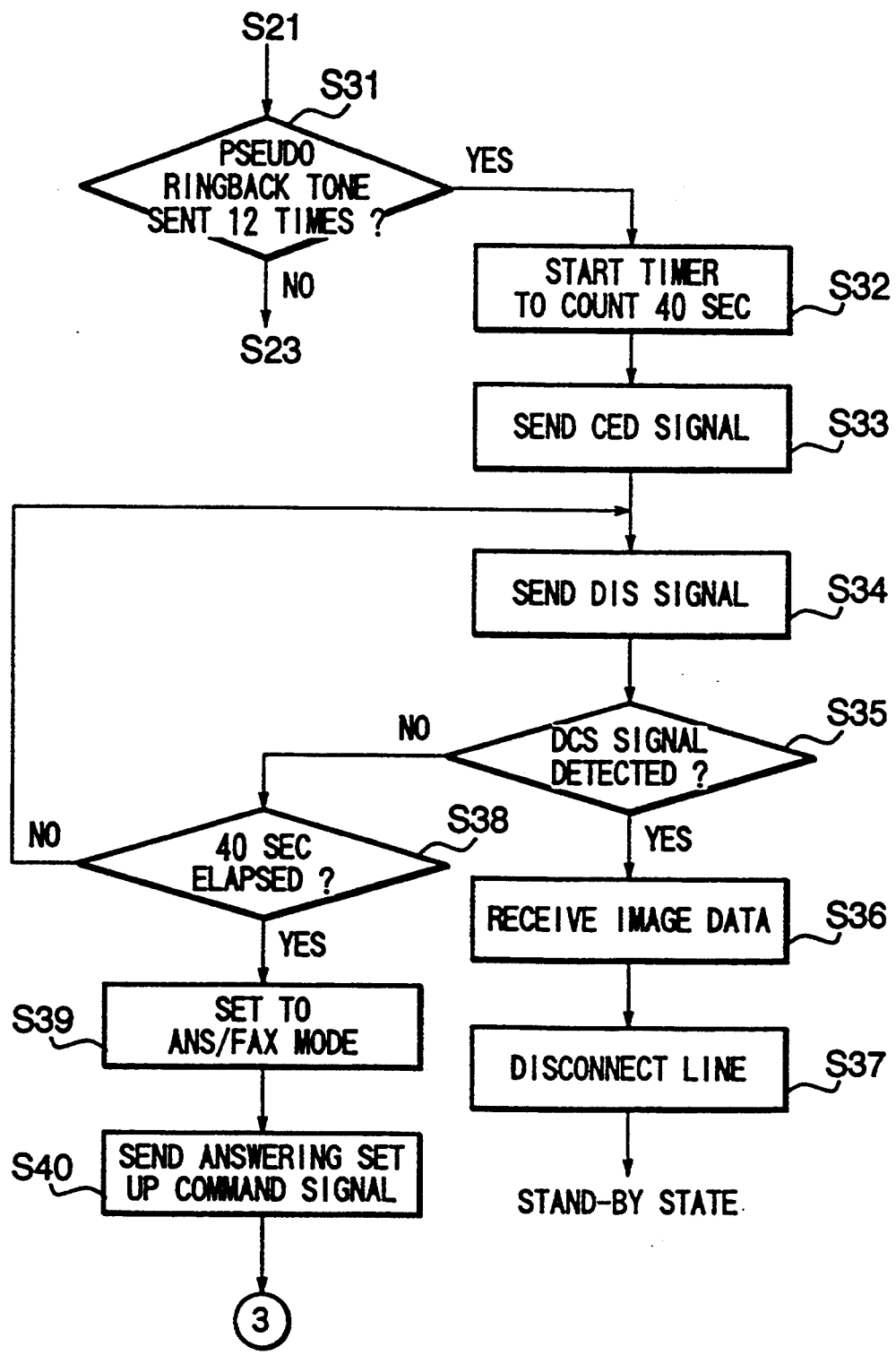
FIG. 6 shows a flowchart for signal reception during a tel/fax mode of a facsimile machine according to a second embodiment of the present invention.

Next, a second embodiment of the present invention will be described with reference to FIG. 6.

In this embodiment, at S31 which corresponds to S22 in FIG. 5 of the previous embodiment, it is judged whether the pseudo ringback tone is already sent twelve times. If the answer is YES, a timer (not shown) is activated to start counting a forty-second period (S32).

Specifically, the CNG signal from the calling party is awaited while the pseudo ringback tone is being transmitted twelve times in the second embodiment. Therefore, if the user goes out with the facsimile machine 1 being set to the tel/fax mode and later calls the facsimile machine 1 from outside, the user will hear the pseudo ringback tone twelve times.

Subsequent to the 40-second measuring by the timer, a CED signal and a DIS signal are transmitted to the calling party (S33 and S34). After that, it is judged whether a DCS signal comes from the calling party (S35). If the answer is YES, it is Judged that the calling party uses a facsimile machine so that reception of image data transmitted from the calling party is initiated (S36). Then, the contacts of the CML relay 36 and the TEL relay 43 are switched to the points "a", respectively, the line is disconnected (S37) and the facsimile machine 1 returns to the stand-by state.

If the DCS signal is not detected at S35, the transmission of the DIS signal is continued at prescribed intervals for a forty-second period measured by the timer to wait for the DCS signal (S38, S34 and S35).

If the forty-second period elapses without receiving the DCS signal, the control mode of the facsimile machine 1 is changed to the ans/fax mode from the tel/fax mode (S39). Then, the answering-set-up command signal is transmitted to the CPU 24 of the recording device 3 so that the recording device 3 enters the answering-/recording stand-by state (S40). At The same time, the program proceeds to S4 in FIG. 3 to transmit a signal reception-start command signal to the CPU 24 of the recording device 3 so that the contacts of the CML relay 36 and the TEL relay 43 are switched to the points "a", respectively, the answering message is transmitted to the calling party and the voice from the calling party is recorded. After that, the control mode of the facsimile machine 1 is maintained to the ans/fax mode.

In the second embodiment, the CPU 7 of the facsimile module 2 changes the control mode to the ans/fax mode from the tel/fax mode and starts sending the answering message to the calling party if a facsimile signal such as a CNG signal and a DCS signal is not received from the calling party in a prescribed period (about forty seconds + forty seconds = about eighty seconds) from the start of the signal reception in the tel/fax mode.

Specifically, the CPU 7 of the facsimile module 2 waits for a CNG signal from the calling party for an about-forty-second period from the initiation of the signal reception. If no CNG signal arrives, then the CPU 7 waits for a DCS signal for another forty seconds. If neither CNG signal nor DCS signal is detected by the CPU 7, it is judged that the calling party does not use a facsimile machine but a telephone. Further, the CPU 7 judges that the calling party intentionally maintains the off hooking based on a fact that the handset on the calling side is not on hooked and the line is maintained in a connected state in spite of no response from the facsimile machine 1 (the called side) for about eighty seconds from the start of the signal reception. Then, the control mode of the facsimile machine 1 is changed to the ans/fax mode, the contacts of the CML relay 36 and the TEL relay 43 are switched to the points "a" respectively and the transmission of the answering message to the calling party is initiated.

According to the second embodiment, therefore, if the user goes out with the tel/fax mode being set and later wishes to change the control mode to the ans/fax mode from outside, the user calls its own facsimile machine 1. Then, the user hears the pseudo ringback tone twelve times for about forty seconds from the start of the signal reception and further maintains the off hooking for about forty seconds. This results in automatic change of the control mode to the ans/fax mode.

Accordingly, like the first embodiment, the simple dialing operation from outside can change the control mode of the facsimile machine 1 to the ans/fax mode. After that, when a third party calls, the facsimile machine 1 on the called side can record the voice message from the calling party.

In addition, like the foregoing embodiment, upon change of the control mode to the ans/fax mode, the transmission of the answering message starts. Therefore, the user calling from outside hears the answering message and can easily and reliably confirm the change of the control mode to the ans/fax mode. The user does not have to redial to confirm completion of the control mode change.

It should be noted that the present invention is not limited to the illustrated embodiments. For example, the following modifications may be made:

(1) In the first and second embodiments, the number of the pseudo ringback tone sent to the calling party may be set to another value (or a period from the signal reception to the automatic change of the control mode may be set to another value);

(2) In the second embodiment, the measuring time of the timer may be set to another value rather than forty seconds; and (3) The buzzer 18 to make the buzzer sound may not be provided. Instead, a bell sound generating circuit may be provided for artificially generating a bell sound, instead of the 16 Hz calling signal, to cause the telephones 4 and 37 to ring.

We claim:

1. A facsimile machine having an answering function, comprising:
    means for automatically performing change from a first control mode to a second control mode, the first control mode enabling switching between voice transmission/reception and image data transmission/reception and the second control mode enabling switching between from-a-calling-party voice recording and the image data transmission/-reception,
    means for generating a pseudo ringback tone and transmitting the pseudo ringback tone to a calling party upon reception of a calling signal from the calling party,
    a timer which starts counting a prescribed period after the pseudo ringback tone is transmitted a predetermined number of times,
    means for detecting a CNG signal from the calling party,
    means for transmitting a DIS signal to the calling party as the timer starts counting the prescribed period, and
    means for detecting a DCS signal from the calling party after the timer starts counting the prescribed period, and wherein the first control mode is changed to the second control mode if the CNG signal is not detected while the pseudo ringback tone is being transmitted the predetermined number of times and the DCS signal is not detected in the prescribed period in the first control mode.

2. The facsimile machine of claim 1, wherein if the CNG signal is detected while the pseudo ringback tone is being transmitted the predetermined number of times, facsimile communication with the calling party is permitted.

3. The facsimile machine of claim 1, wherein if the DCS signal is detected in the prescribed period, facsimile communication with the calling party is permitted.

4. A facsimile machine having an answering function, comprising:
    setting up means for changing a control mode of the facsimile machine from a first control mode to a second control mode if a facsimile signal does not come form a calling party within a first prescribed period from signal reception in the first control mode and for transmitting an answering message to the calling party, the first control mode enabling switching between voice transmission/reception and image data transmission/reception and the second control mode enabling switching between from-a-calling-party voice recording and the image data transmission/reception,
    means for generating a pseudo ringback tone and transmitting the pseudo ringback tone to the calling party upon reception of a calling signal from the calling party,
    a timer which starts counting a second prescribed period after the pseudo ringback tone is transmitted a predetermined number of times,
    means for detecting a CNG signal from the calling party,
    means for transmitting a DIS signal to the calling party as the timer starts counting the second prescribed period, and
    means for detecting a DCS signal from the calling party after the timer starts counting the second prescribed period, and wherein the first control mode is changed to the second control mode if the CNG signal is not detected while the pseudo ringback tone is being transmitted the predetermined number of times and the DCS signal is not detected in the second prescribed period in the first control mode.

5. The facsimile machine of claim 4, wherein if the CNG signal is detected while the pseudo ringback tone is being transmitted the predetermined number of times, facsimile communication with the calling party is permitted.

6. The facsimile machine of claim 4, wherein if the DCS signal is detected in the second prescribed period, facsimile communication with the calling party is permitted.

* * * * *